United States Patent [19]

Rendessy

[11] 3,989,269

[45] Nov. 2, 1976

[54] SWAY CONTROL DEVICES UTILIZABLE IN CONJUNCTION WITH EQUALIZER HITCHES

[76] Inventor: William L. Rendessy, P.O. Box 15571, Phoenix, Ariz. 85060

[22] Filed: Nov. 17, 1975

[21] Appl. No.: 632,243

Related U.S. Application Data

[63] Continuation-in-part of Ser. No. 502,058, Aug. 30, 1974, Pat. No. 3,920,266.

[52] U.S. Cl. .............................. 280/446 B; 280/457
[51] Int. Cl.² ............................................. B60D 1/00
[58] Field of Search ........ 280/446 B, 446 R, 446 A, 280/457, 511

[56] References Cited
UNITED STATES PATENTS

| | | | |
|---|---|---|---|
| 3,297,340 | 1/1967 | Rendessy | 280/446 R |
| 3,724,875 | 4/1973 | Hillman | 280/446 B |

Primary Examiner—Kenneth H. Betts
Assistant Examiner—John A. Pekar
Attorney, Agent, or Firm—Warren F. B. Lindsley

[57] ABSTRACT

A sway control device for mounting on a towing vehicle employing a flexible connector passing over a frictionally damping surface or surfaces for preventing uncontrolled lateral movements of the towed vehicle.

The flexible connector comprises preferably a tough, durable belt or cable having an external surface suitable for frictional damping use. A curved or arcuate structure is used in conjunction with the flexible connector for providing the friction damping surface which is positioned to encompass the common pivotal hitch connection of a towed trailer to the towing vehicle to retain and limit vertical, lateral, forward and rearward movement of the trailer coupler in event of disconnection while the trailer is being towed. Means for attachment of a safety chain linkage is incorporated into the device for additional safety when towing. Simplicity of installation, operation and interchangeability of the device is dependent on the design and utility of its component structure for proper operational functioning and for use on other trailers to be towed by the same vehicle are features of the disclosed device.

19 Claims, 22 Drawing Figures

SWAY CONTROL DEVICES UTILIZABLE IN CONJUNCTION WITH EQUALIZER HITCHES

This application is a continuation in part of application, Ser. No. 502,058, filed Aug. 30, 1974 now U.S. Pat. No. 3,920,266 entitled DUAL PURPOSE TRAILER SWAY CONTROL DEVICE AND SAFETY CONNECTOR FOR MOUNTING ON EITHER THE TOWED OR TOWING VEHICLE, by the same inventor and an improvement on U.S. Pat. No. 3,871,686, issued Mar. 18, 1975.

BACKGROUND OF THE INVENTION

The use of towed trailers behind automobiles and lightweight trucks has become quite commonplace and the hazards associated with such vehicular combinations are well known. A particularly dangerous characteristic of the towed trailer is its tendency to sway from side to side under conditions initiated by sudden turns, cross winds, air drafts produced by passing trucks, improper loading of the trailers, among other things. Certain combinations of various parameters such as the length of the trailer tongue, the weight of the load, and the surface of the highway increase the tendency for the trailer to sway and even increase the intensity or amplitude of the swaying action once it has started. Under such conditions it is difficult if not impossible for the driver of the towing vehicle to maintain control of his vehicle. The combination of the towing vehicle and the trailer in the presence of such critically related parameters contributes an unstable mechanical system.

Prior art disclosures have been limited in scope and have provided for devices only to lessen or prevent the swaying motion of trailers. Some of these devices are complicated in structure involving pulleys or spools, brake shoes, telescoping structures employing friction or hydraulic damping means and usually have numerous parts requiring periodic replacement otherwise the devices may become dangerous within themselves. Furthermore, some prior art devices employ only one means of connection on only one side of the longitudinal axis of the towed trailer to obtain sway control presenting a potentially dangerous condition should the trailer tongue break away from the towing vehicle when in motion. Nearly all of the prior art structures require component parts that are difficult to install an require complicated instructions for mounting and operation.

SUMMARY OF THE INVENTION

In accordance with the invention claimed, improved mounting structures for a sway control device are provided having one or more fixed, curved or arcuate surfaces adapted to be mounted on the hitch bracket of a towing vehicle interconnected by flexible operating means secured to opposite sides of a trailer being towed. Adjustment means are provided to cause tension in the flexible means inducing frictional restraint of movement of the flexible means about the curved or arcuate surfaces coincident with any lateral movement of the towed vehicle.

It is, therefore, one object of this invention to provide an improved sway control device for mounting on the towing vehicle.

Another object of this invention is to provide such improved structures and components therefor for mounting to a hitch bracket adapted to be secured to a towing vehicle.

A further object of this invention is to provide a cross member secured to the hitch bracket of a towing vehicle to significantly increase the area of the hitch bracket and to which curved or arcuate surfaces or other suitable friction restraining constructions are fixedly secured to confine and limit movement of the trailer coupler in event of accidental disconnection of the pivotal hitch connection.

A still further object of this invention is to provide structures utilizing flexible means moving over friction inducing surfaces to cause frictional damping to restrain pivotal movement of a hitch coupler about a conventional hitch ball.

A still further object of this invention is to provide sway control structures that are readily secured or removed from the hitch of a towing vehicle by employing simple mounting brackets that can be permanently welded to a hitch bracket at the factory prior to installation on a towing vehicle to save installation costs.

A still further object of this invention is to provide a sway control device having structures attached to a towing hitch bracket to avoid obstruction that may be prevalent on trailer tongues.

A still further object of this invention is to provide a dual function structure utilized in conjunction with safety chains for a trailer sway control device that would prevent the tongue of a trailer from dropping to the road in event it accidentally became disconnected from the towing vehicle while being towed.

A still further object of this invention is to provide a sway control device structure mountable on a towing vehicle and connectable to a plurality of trailers.

A still further object of this invention is to provide a sway control device with structures that require little or no maintenance or periodic adjustments.

A still further object of this invention is to provide a sway control device with structures which will not readily wear out or require replacement of moving parts.

A still further object of this invention is to provide a sway control device with structures that also serve the dual function of a safety connector between the towing vehicle and the trailer being towed.

A still further object of this invention is to provide a sway control device which is easily installed, connected and adjusted for operation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 5 is an enlarged partial view of the connector tensioning device shown in FIGS. 1–3.

DESCRIPTION OF THE PREFERRED EMBODIMENT

Referring more particularly to the drawings by characters of reference, FIGS. 1–3 disclose a sway control device 10 comprising curved surface 18 and plate 20 hereinafter explained mounted on a conventional towing hitch 11 of a vehicle 12 having a hitch ball 14 bolted thereto to extend substantially vertically therefrom for receiving a hitching ball socket or coupler 15. Coupler 15 has its rearward extending shank 16 fixed to the forward joined ends of a pair of hitching arms 17 of a trailing vehicle (not shown) by suitable means to form a part of the tongue of a trailer.

Figures 1, 2, 3:
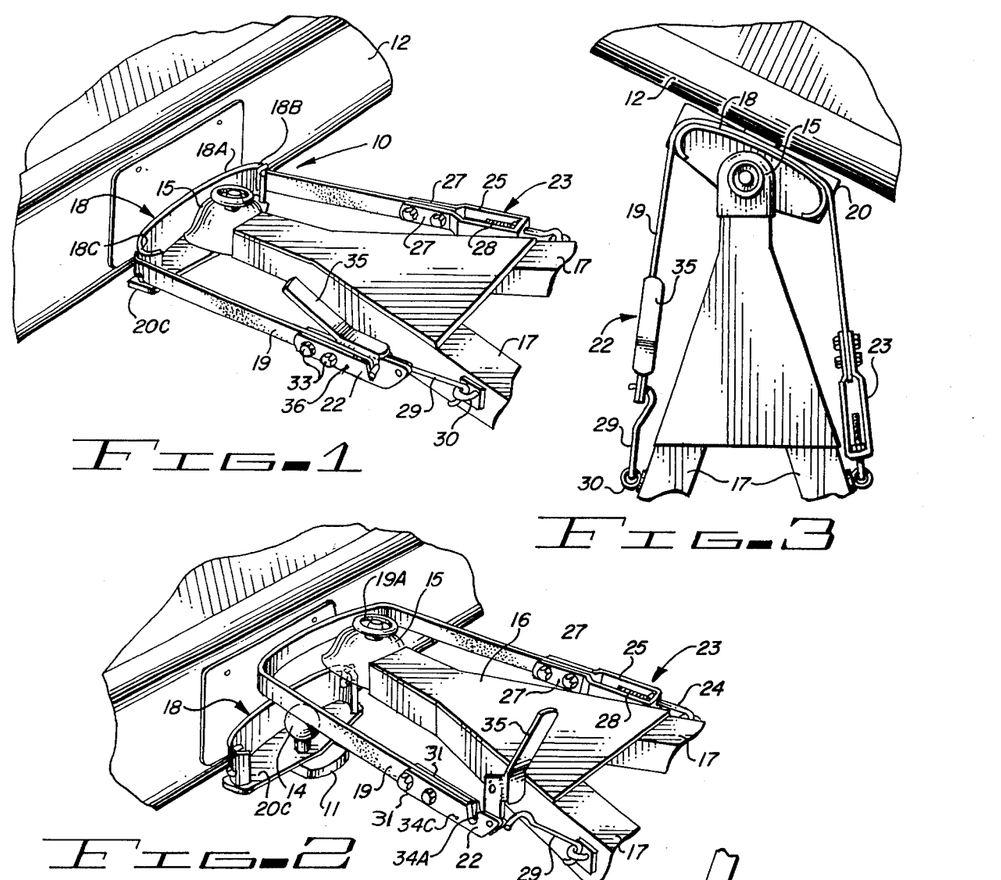
FIG. 1 is a perspective view showing one model or embodiment of improved sway control structures mounted on the conventional hitch bracket of a towing vehicle and connected to the tongue of a trailer.
FIG. 2 is a view similar to FIG. 1 with the sway control device in position over the hitch ball of the hitch bracket.
FIG. 3 shows a partial plan view of a sway control device similar to that shown in FIG. 1 with the towing vehicle in an angular position to the towed vehicle.

The sway control device 10 comprises one or more curved surfaces 18 fixedly mounted on either the towing hitch 11 of the towing vehicle, as shown in FIGS. 1–3, or on the hitching arms 17 or ball socket shank 16 of the towed vehicle, as shown in U.S. patent application, Ser. No. 502,058, filed Aug. 30, 1974 by William L. Rendessy.

FIGS. 1–3 illustrate the curved surface 18 comprising a cup shaped metallic strip like configuration formed to curve partly around the hitch ball 14 to provide on its outer circumference friction bearing surfaces 18A, 18B and 18C for a flexible connector 19 herein shown in a belt like configuration.

Figure 5:
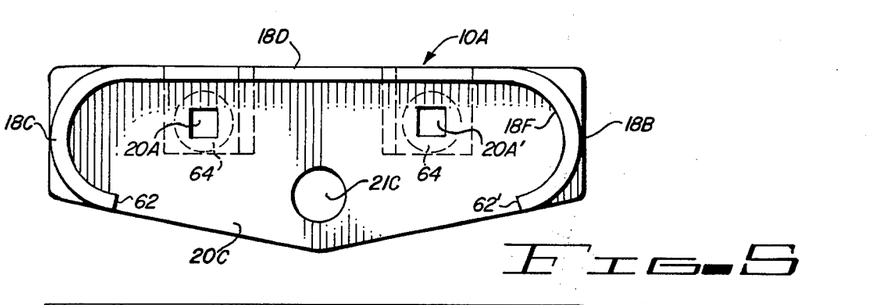
FIG. 5 is a top view of a modification of the fraition bearing curved surface of the sway control device shown in FIGS. 1–3.

The curved surface 18 is suitably connected such as by welding on one edge to a flat plate 20 which is secured in turn to the trailer hitch bracket 11. Flat plate 20C is provided with an aperture 21C therethrough, as shown in FIG. 5, for receiving the hitch ball 14.

It should be recognized that the flat plate 20C and curved convex surface 18 may be welded or otherwise secured to the towing hitch 11 or to the flat surface of a step bumper of a truck and sold as a unit or part of the towing hitch bracket or independently thereof as a separate sway control device for attachment to the towing hitch bracket or hitching arms 17 of a towed vehicle.

The flexible connector 19 may comprise a belt or cable formed of suitable material and is available in the marketplace having flexibility and wear characteristics of tough heavy duty conveyor belting. This connector is placed over the curved surface 18 of the sway control device 10 around its outer circumferential surfaces 18A, 18B and 18C of FIG. 1 and suitably connected at one end by means of a toggle release or clamp 22 to the hitching arms 17 of the towed vehicle and at its second end through a turnbuckle 23 and hook 24 to the other hitching arm 17 of the towed vehicle. Turnbuckle 23 is utilized to adjust the belt or cable as desired.

Turnbuckle 23 comprises a cylindrical housing 25 having a longitudinal slot 26 with an axial threaded opening at one end thereof. The other end of the housing is provided with a pair of juxtapositioned longitudinally extending arms 27 which are arranged to have extending therebetween in bolted connection thereto one end of belt 19, as shown in FIGS. 1 and 2. A single stud 28 is threaded into the axial opening in housing 25 of the turnbuckle which in turn is pivotally attached to hitching arms 17 of the towed vehicle by a simple hook and eye arrangement, as shown. Since only one stud is used, the turnbuckle has to be disconnected to turn.

The toggle release 22 is bolted or riveted to the other end of belt 19 as shown in FIGS. 1 and 2, and connects by means of a hook 29 to an eye bolt 30 which is attached to the hitching arms 17 of the towed vehicle. This toggle release provides a means for quickly applying or releasing tension in belt 19 for tightening or disconnecting the sway control device 10 from the towed or towing vehicle.

Figure 4:
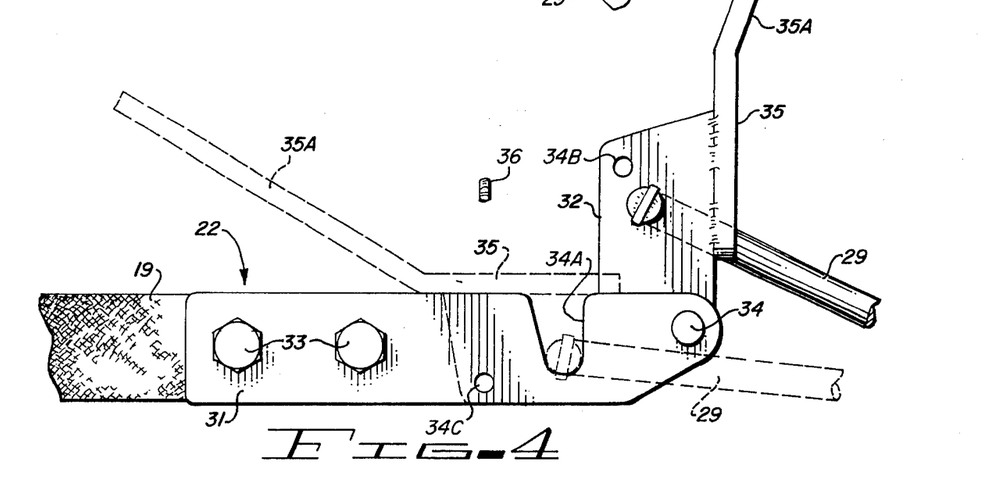
FIG. 4 is an enlarged partial view of the connector tensioning device shown in FIGS. 1–3.

As shown in FIG. 4, the toggle release comprises an elongated outer member 31 having an inner member 32 pivotaly attached at one end for nesting inside of member 31 with hook 29 pivotally mounted within outer member 31. Outer member 31 is in the form of two parallel flat metal straps joined together by transverse metal pins 33 tightly holding between the straps the end of belt 19.

When inner member 32 of the toggle release is fully nested inside outer member 31, it is in a below center position. Reference is made to the patent application referred to above for more detail of a similar toggle release 22 which toggle releases are well known in the art and will not be described in more detail herein for simplicity purposes.

In the nested position and with hook 29 attached to a fixed point on the hitching arm 17, as shown in FIGS. 1 and 2, tension is applied belt 19. Member 32 is kept in the dotted position by hook 29 dropping below pin 34, as shown in FIG. 4, which causes it and member 31 to form a below center locket toggle configuration. To release the toggle end 35A of plate 35 must move hook 29 back over center to open the lock in a manner well known in the art.

To release toggle release 22 in the presence of belt tension, the raised end 35A of plate 35 may be grasped and forced upwardly against the downward force produced by the belt tension. As inner member 32 thus raises in its rotation about pin 34, the effective length of the toggle release assembly increases and relieves the tension. The increased effective length of the toggle release in the fully released position also allows for the disengagement of hook 29 from the ring 30 or other means to which it had been attached.

To prepare sway control device 10 for use, the trailer hitch ball socket is first coupled to the towing vehicle by placing and firmly attaching the coupler over the hitch ball 14. The ends of belt 19 are attached as shown in FIGS. 1 and 2 through hooks 24 and 29 to the hitching arms 17 of the towed vehicle. The intermediate portion 19A of the belt 19 is then placed around the outer circumferential friction bearing curved surface 18 of the sway control device. Thus, belt 19 makes contact with the curved surface 18 of the sway control device when the toggle release 22 is forced to the nested or closed position after turnbuckle 23 is adjusted to produce the desired tension in belt 19 which now follows a curved path beginning at one end of curved surface 19 and passing around its full curved surface, as shown in FIG. 1 to its point of attachment to turnbuckle 23.

As tension in belt 19 is increased, belt 19 bears against curved surface 18 with increasing pressure and the additional force which must be applied to overcome this friction to produce relative displacement between belt 19 and the outer peripheral bearing surface of curved surface 18 is correspondingly increased.

As shown in FIGS. 1, 2 and 3, the curved surface 18 comprises an intermediate curved surface 18A terminating in two similar curved ends 18B and 18C. Each curved end is so configured with its relationship to the coupler as to provide the proper turning arrangement so as to keep the belt 19 free from all obstructions when the towed and towing vehicle assume any angular position.

Figure 6:
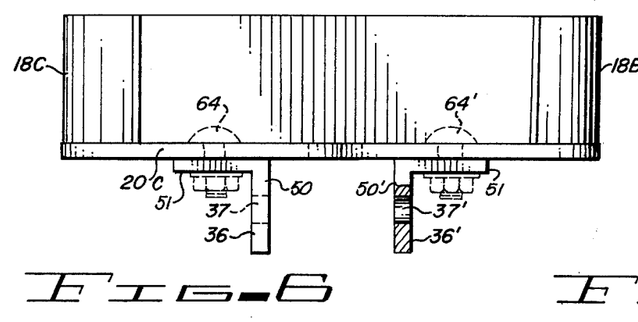
FIG. 6 is a front view of the structure shown in FIG. 5 showing mounting angle brackets.
Figure 7:
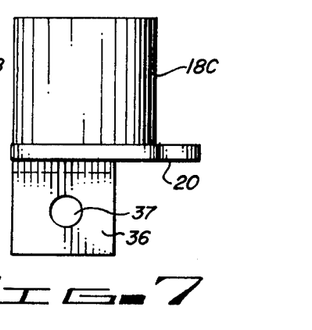
FIG. 7 is an end view of the structure shown in FIG. 6.

FIGS. 5, 6 and 7 illustrate a modification of the sway control device 10 wherein the sway control device 10A differs from sway control device 10 by the curved surface 18A being replaced by a substantially straight portion 18D. The curved ends 18B and 18C remaining substantially the same. It should be noted that the flat plate 20C of sway control device 10A may be provided with two spaced right angular brackets 36, 36' provided with aligned apertures 37, 37', respectively. Flanges 36, 36' are welded or bolted to flat plate 20 and are so positioned to fit over and bolted through apertures 37, 37' to the towing hitch bracket 11.

Figure 8:
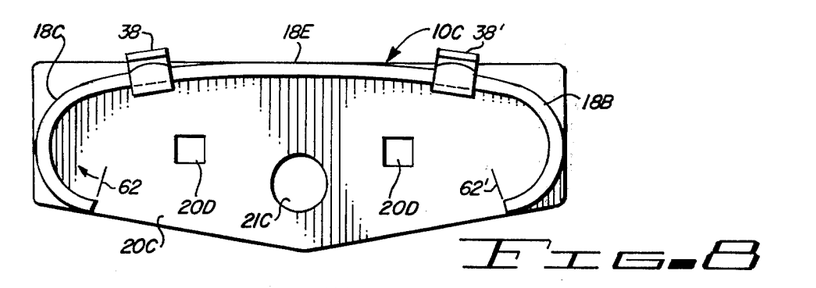
FIG. 8 is a further modification of the sway control device shown in FIGS. 1–7 employing brackets for holding the flexible connector in place on the fixed curved surfaces of the sway control device.
Figures 9, 10:
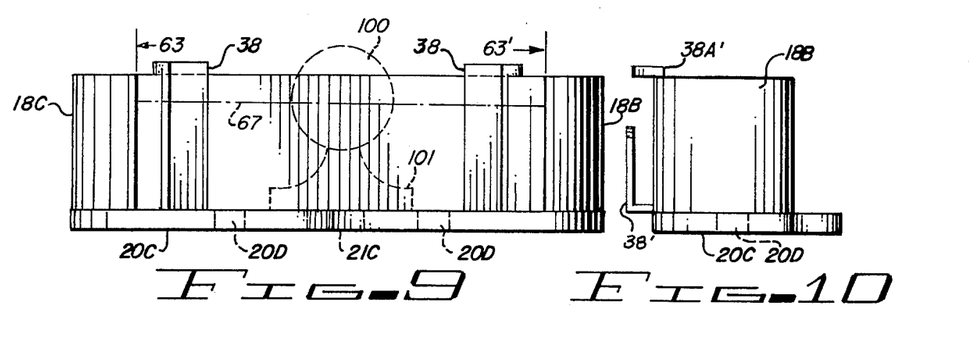
FIG. 9 is a front view of the structure shown in FIG. 8.
FIG. 10 is an end view of the structure shown in FIG. 9.

FIGS. 8, 9 and 10 illustrate a further modification of the sway control device of FIGS. 1 and 2 which sway control device 10C is modified merely by fixing brackets 38 to selected positions along the curved surface 18 for maintaining belt 19 in position along the curved surface 18. Plate 20C is provided with an aperture 21C for receiving the hitch ball stud and apertures 21D for bolting to a trailer hitch bracket or step bumper of a truck.

Figure 11:
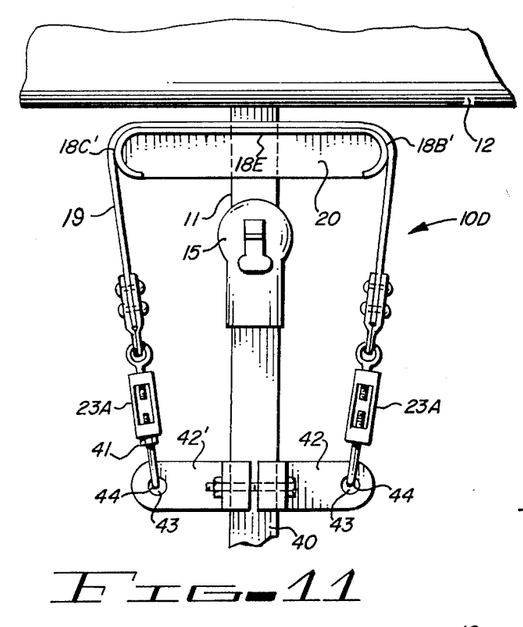
FIG. 11 is a top plan view of a further modification of the sway control device shown in FIGS. 1–10 connected to the hitch bracket of a towing vehicle.

FIG. 11 illustrates a further modification of the sway control devices shown in FIGS. 1–10 wherein the sway control device 10D varies from sway control devices 10 and 10A of FIGS. 1, 2 and 5–7 by utilizing a straight surface 18E for interconnecting curved ends 18B' and 18C'. This surface arrangement may be fixed to, as by welding, flat plate 20C of the sway control device. This sway control device may be welded directly to the hitch bracket 11 of the towing vehicle as shown.

It should be noted that in this modification two turnbuckles 23A may be employed one on each end of belt 19 for tightening the belt around the curved ends 18B' and 18C' of the sway control device with the free ends of the turnbuckles connected to single tongue structure 40 of a towed vehicle. As noted, a tightening lock nut 41 is used with one of the turnbuckles to lick it in place.

Figure 12:
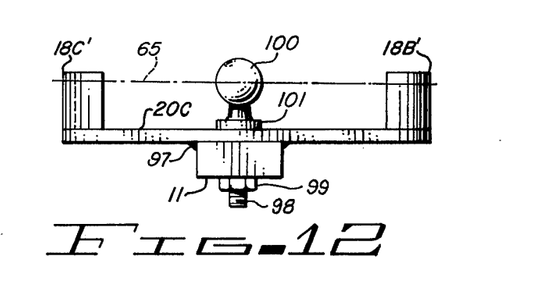
FIG. 12 is a front view of a further modification of the sway control device shown in FIG. 11 omitting the middle section of the curved surface mounted on the hitch bracket of the towing vehicle.

FIG. 12 illustrates a modification of the sway control devices shown where the curved surfaces 18B' and 18C' of FIG. 11 are fixed to plate 20C without the interconnecting surface 18E.

Figure 13:
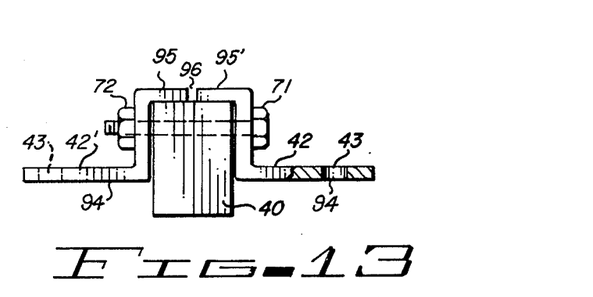
FIG. 13 is a cross-sectional view of an adaptor shown in FIG. 11 for connecting the sway control to a single tongue trailer.

FIG. 13 illustrates one form of adaptor 42 for clamping over the tongue 40 of the towed vehicle as shown in FIG. 11. This adaptor clamped to the tongue 40 of the towed vehicle is provided with two apertures 43 for receiving the hook ends 44 of the turnbuckles 23A.

Figure 14:
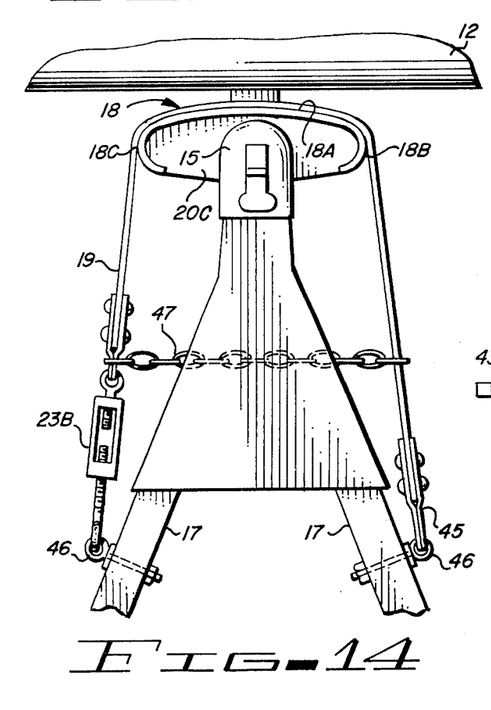
FIG. 14 is a still further modification of the sway control devices shown in FIGS. 1–13 secured to the trailer hitch of a towing vehicle.

FIG. 14 shows a further modification of the structure of the sway control device illustrated in FIGS. 1 and 2 showing a simple hardware arrangement wherein a simple eye bolt 46 is connected at one end of belt 19 with a turnbuckle arrangement 23B used at the other end for controlling the tension of belt 19 around curved surface 18A and ends 18B and 18C of the sway control device.

A safety chain 47 may be interconnected with connector 19 as shown in FIG. 14 to keep the tongue of the trailer from dropping to the road bed if the coupler 15 becomes disconnected from the towing vehicle.

It should be noted in FIGS. 12 and 14 that plate 20C increases the width and area of the hitch bracket considerably over the conventional hitch brackets. In the event of breakaway of the coupler from the hitch ball during towing, the inner surfaces of curved surfaces 18B and 18C and 18B' and 18C' will limit lateral movement of the coupler. The straight or curved surfaces 18E and 18A, respectively, will limit forward movement of the coupler. Connector 19 limits rearward movement of the coupler and plate 20C prevents the coupler from dropping to the roadway. Thus, the improved sway control structures disclosed also provide a safety function which heretofore was not possible with the prior art devices.

Figure 15:
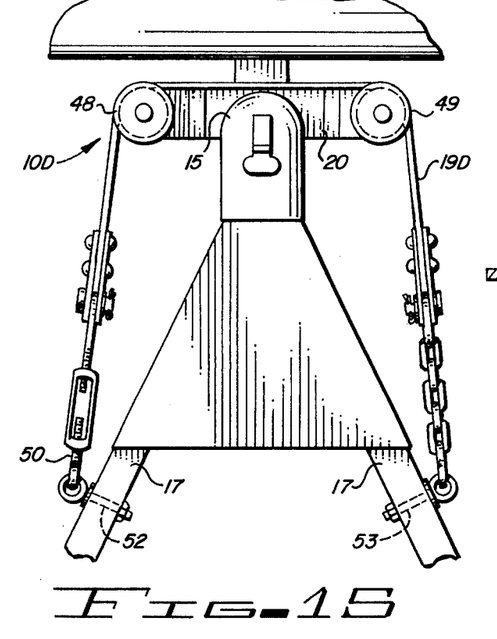
FIG. 15 is a further modification of the sway control devices shown in FIGS. 1–14 wherein the curved surfaces are replaced with rotors.

FIG. 15 discloses a further modification of the structure shown in FIGS. 1-14 and particularly FIG. 11 wherein sway control device 10D comprises rotors 48 and 49 in place of the curved surfaces 18B' and 18C' mounted on plate 20D. Connector 19D is placed over the rotors and connected with hooks 50 and 51 to eye bolts 52, 53, as shown, and operates in substantially the same manner as the structure shown in FIG. 1.

Figure 16:
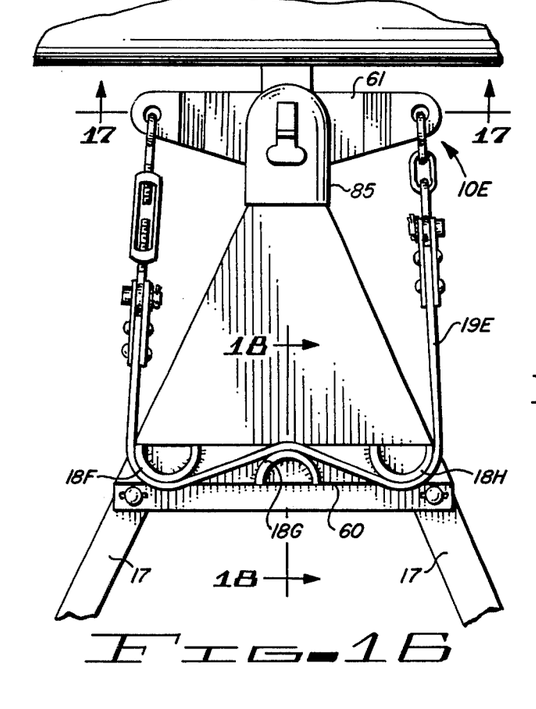
FIG. 16 is a still further modification of the sway control devices shown in FIGS. 1–15 wherein a plurality of curved surfaces are mounted on the tongue of the towed vehicle.
Figure 17:
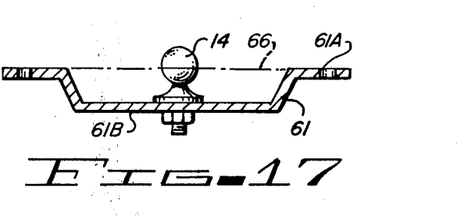
FIG. 17 is a partial end view of the bracket for mounting the curved friction damping surfaces on the tongue of the trailer.
Figure 18:
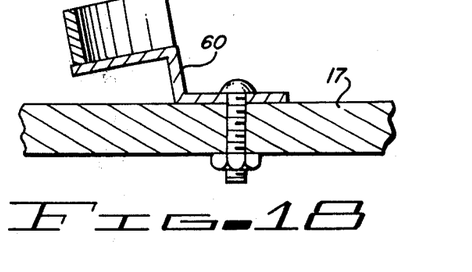
FIG. 18 is a cross-sectional view of FIG. 16 taken along the line 18—18.

FIGS. 16–18 illustrate a still further modification of sway control devices shown in FIGS. 1–15 wherein device 10E comprises curved surfaces 18F, 18G and 18H mounted on a bracket 60 attached to the tongue of a trailer. The flexible connector 19E is placed in a serpentine manner around curved surfaces 18F, 18G and 18H as shown with its free ends detachably mounted to a hitch bracket 61. The hitch bracket supports the hitch ball 14 as shown in FIG. 17.

It should be recognized that the use of the disclosed sway control devices and component structures eliminates the need for the usual safety chains on towed vehicles since belt 19 serves that purpose and is at least an equivalent in strength. If at all times is around and interconnected with the towed vehicle when taut and thus serves the safety chain purpose.

It should be noted that threaded shank 98 of hitch ball 100 shown in FIG. 12 is mounted through aperture 21C shown in FIGS. 5, 8 and 9 which is centrally located between opposite curved end surfaces 18C and 18B shown in FIG. 6. The shank then extends through an aperture (not shown) provided in hitch bracket 11 to centrally located and to properly position the sway control device such as device 10 of FIG. 1.

Flange 101 of hitch ball 100, FIGS. 9 and 12, secures plate 20C to hitch bracket 11 by tightening nut 99 of threaded shank 98 against the bottom portion of hitch bracket 11. Plate 20C, FIG. 12, can additionally be secured such as by weld 97 to hitch bracket 11 or by brackets 36 and 36' of FIG. 6.

Brackets 36 and 36' of FIG. 6 are of right angular construction having vertically positioned inner surface portions 50 and 50' each provided with one or more apertures oppositely aligned with each other and upper portions 51 and 51' adjacent and parallel to plate 20C. Portions 51 and 51' are each provided with one or more apertures or a single slotted aperture (not shown) to permit increasing or decreasing the distance between surfaces 51 and 51' of FIG. 6 as may be required for mounting onto hitch bracket 11 of FIGS. 2 and 12. Preferably carriage bolts with suitable washers and nuts align apertures 20A and 20A' of FIG. 6 with apertures provided in upper portions of angle brackets 51 and 51' to permit securing of plate 20C to angle brackets 36 and 36'.

Opposite inner surfaces 50 and 50' of brackets 36 and 36' of FIG. 6 are slipped over hitch bracket 11 of FIGS. 2 and 12. Apertures 37 and 37' of FIG. 6 are so positioned underneath the bottom of hitch bracket 11 of FIG. 2 that a bolt (not shown) when placed through aperture 37 extends underneath hitch bracket 11, and through aperture 37' of angle bracket 36. The threaded portion of the bolt is provided with a suitable washer and a nut to sandwich and secure angle brackets 36 and 36' to the sides of hitch bracket 11.

It is to be noted that surface 18E of FIG. 8 of arcuate structure 18 of FIG. 1 is positioned sufficiently distant from hitch ball 14 to allow the forward portion of socket 15 to manuever about hitch ball 14 without interference.

Arcuate surface 18 shown in FIG. 1 is suitably secured adjacent its bottom portion to plate 20C such as by welding or may be the upper portion of a single casting extending laterally from plate 20C.

Opposite end portions 18B and 18C of arcuate surface 18 are curved inwardly toward each other ending at points 62 and 62' shown in FIG. 8 to allow belt 19 of FIG. 3 to be in full contact with either curved surface when the towing vehicle is in a turned position as indicated.

Sufficient unoccupied space within arcuate surface 18 must be allowed between its ends 62 and 62' to permit coupler 15 to pivot into extreme turns without lateral interference of the arcuate surface 18. The preferred spaced apart distance between open ends 62 and 62' also shown as 63 and 63' in FIG. 9 is approximately 9 inches and not less than 4 inches nor more than 15 inches.

A preferred perimeter length of arcuate surface 18 shown in FIG. 1 beginning at open end 62 and ending at 62' shown in FIG. 8 is approximately 13 inches and not less than 6 inches nor more than 24 inches. Portion 18D of FIG. 5 arcuate surface 18 shown in FIG. 1 may be a straight surface or it may be a curved surface as shown in 18E of FIG. 8 of not less than a 2 inch radius fulcrumed from a point (not shown) passing perpendicularly through the aperture 21C. Portion 18D shown in FIG. 5 may be omitted as shown in FIG. 12.

A preferred distance between top of plate 20C and top of arcuate surface 18 is predetermined by the width of the center of belt 19 in horizontal alignment with an axis 67 of hitch ball 100 i.e. the distance from the top of plate 20C, FIG. 9, to centerline 67 plus one-half the actual belt width. Should this distance vary more than one inch above or below centerline 67, belt 19 may either tighten or loosen when manuevering the trailer through dips and over mounds. The preferred height of arcuate surface 18, FIG. 1, from top of plate 20C is not less than 1 inch nor more than 4 inches.

A pair of oppositely spaced apart brackets 38 and 38' (FIGS. 8, 9 and 10) maintain belt 19, FIG. 1, in vertical alignment with the axis of hitch ball 100, FIGS. 9 and 12, and prevent the belt from becoming disengaged from arcuate surface 18.

It should be noted that sway control device 10 shown in FIG. 2 adapted for attachment to A frame type trailer tongues such as indicated at 17, requires only structres such as eyebolts 30 mounted to each side of the trailer tongue to receive hooks 24 and 29 for connection to belt 19. However, when connection is made to a single tongue trailer 40 shown in FIGS. 11 and 13 a pair of brackets 42 and 42' are employed utilizing spaced apart apertures 43, FIG. 11, for engagement by hooks 44 for operational function of the sway control device 10D.

Mounting brackets 42 and 42' for single tongue trailers, FIG. 13, are especially constructed for simplicity of attachment. Upper portions 95 and 95' of brackets 42 and 42' are adjacent and parallel to the top of tongue 40. Lower portions 94 and 94' are parallel to upper portions 95 and 95' and extend vertically upwardly at 90 degree angles adjacent side portions of tongue 40 approximately 1 and one half inches but not less than one half inch nor more than 3 inches to upper portion of brackets 95 and 95'. At least one aperture (not shown) is provided in each of the sides of brackets 42 and 42' in alignment with each other through which bolt 71, FIG. 13, passes and through an aligned hole in tongue 40. Securing brackets to tongue 40 is simply done by tightening nut 72. The height of portions 94 and 94' is determined in relation to height of belt brackets 38 and 38', FIGS. 8 and 9, and should be parallel thereto when towing vehicle and trailer are interconnected for towing. A reinforcing strap may be extended from the upper bracket portions 95 and 95', (not shown), to lower portions 94 and 94', FIG. 13, to increase strength of brackets 42 and 42'.

Figures 19, 20, 21, 22:
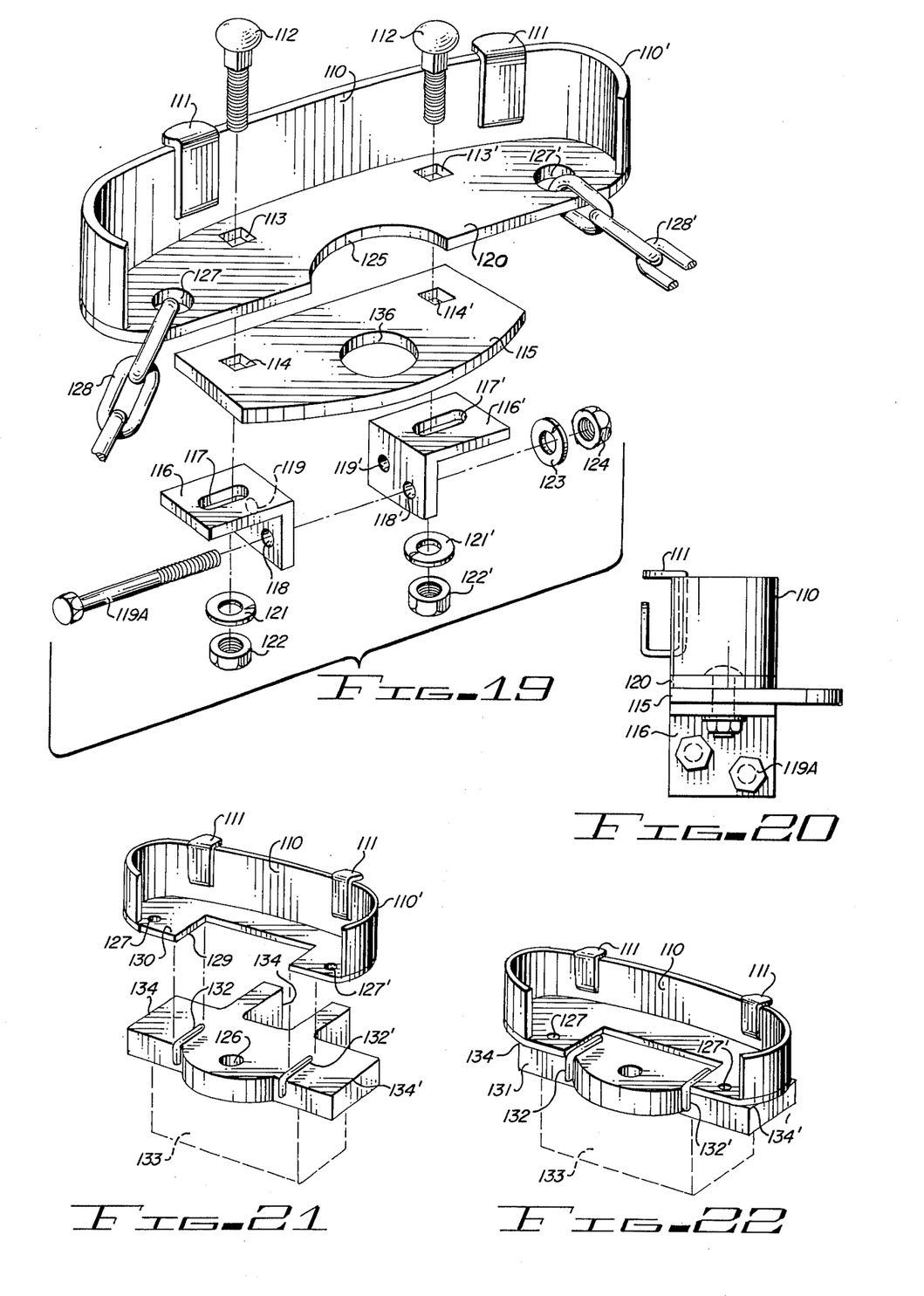
FIG. 19 is an exploded perspective view of a further modification of the sway control device shown in FIGS. 5–10 adapted for use with equalizer heads.
FIG. 20 is an end view of the structure shown in FIG. 19 in assembled relationship.
FIG. 21 is an exploded perspective view of a further modifiction of the sway control device shown in FIG. 19 in association with an equalizer head.
FIG. 22 is a perspective assembled view of the structure shown in FIG. 21.

FIG. 19 shows a modification of bottom portion 20C of FIG. 8, with a section containing aperture 21C removed and with a semi-circular cut out substituted therefor to partially surround the flange 101 shown in FIG. 9 of the hitch ball.

More particularly, FIG. 19 illustrates a further modification of the sway control devices shown in FIGS. 5, 6, 7, 8 and 9 wherein bottom portion 120 is provided with holes 113 and 113' for bolt on purposes to class 1 and 2 hitch brackets indicated as 11, FIGS. 2 and 12. A plate 115 is provided with spaced apart holes 114 and 114' stamped in alignment with holes 113 and 113' an aperture 126 large enough to accept the threaded shank portion of a conventional hitch ball but not its middle flanged portion 101 shown in FIG. 9. Angle brackets 116 and 116' are provided with slots 117 and 117' to adjust to the width of the class 1 or class 2 hitch bracket 11 shown in FIG. 12. Holes 119 and 119' are used in conjunction with class 1 hitch brackets with bolt 119A passing through these holes underneath the hitch bracket. Holes 118 and 118' are used with class 2 hitch bracket which are of greater thickeness than class 1 hitch bracket. Thus, bolts 112 and 112' pass through holes 113 and 113', holes 114 and 114' of plate 115 and then through elongated slots 117 and 117' and are bolted together by lock washers 121, 121' and nuts 122, 122' to form the assembly shown in FIG. 20. Bolt 119A is then placed through the desired apertures of angle brackets 116 and 116' which are then drawn tightly together against the sides of a hitch bracket by lock washer 123 and nut 124. The threaded shank portion of a hitch ball is placed through hole 126 of plate 115 and then through a similar aperture provided for class 1 and 2 hitch brackets and threadly tightened thus securing plate 115 to the hitch bracket.

Holes 127 and 127' are additionally provided in the bottom portion 120 as a convenient method for securing safety chains 128 and 128' in close proximity to the hitch coupler of a trailer vehicle and thus requiring less chain linkage and also aiding in the prevention of the hitch coupler from dropping to the roadway in event of is accidental disconnection from the towing vehicle. The chain linkage may consist of two separate short chains attached to each side of a trailer or a single chain (not shown) passing through an aperture provided for a trailer underneath the hitch coupler 16 shown in FIG. 1.

FIG. 21 illustrates a modification of bottom portion 20C of FIG. 8 wherein aperture 21C is removed and an elongated cut out section 129 is provided to surround obstructions that may be present on the top portions of some conventional equalizer heads such as moveable trigger levers 132, 132' on equalizer head 133. Each of the trigger levers function as a means to contain spaced apart spring bars mounted in or on the equalizer head which are used in conjunction with the equalizer head and attached to opposite sides of a trailer tongue to transfer some of the tongue weight of a trailer from the rear portion of a towing vehicle to the front portion of a towing vehicle thus preventing the rear portion of a towing vehicle from sagging.

Recess 125 of bottom portion 120 shown in FIG. 19 properly positions arcuate surface 110 when it is placed rearward and adjacent the flange 101 shown in FIG. 12 of a conventional hitch ball. Bottom portion 120 can then be easily welded onto the top portion of a conventional equalizer head 133 as shown in FIG. 21 that does not employ obstructions such as trigger levers 132 and 132'. Welding the sway control device disclosed to a equalizer head at the factory would constitute an improvement of the equalizer head and reduce welding and installation costs by the user.

Cut-out portion 129 of bottom portion 131 of FIGS. 21 and 22 is designed to slip over trigger levers 132 and 132' as shown in FIG. 22. This modification may also be welded to equalizer head 133 at points 134 and 134' either at the factory or by qualified welders at purchaser's option.

It should be recognized that the top portion of any conventional equalizer head may be modified to conform to arcuate surface 110' thus in effect establishing the top portion of equalizer heads such as 133, FIG. 21, to constitute a combination equalizer and sway control device.

Although but a few embodiments of the invention have been illustrated and described, it will be apparent to those skilled in the art that various additional changes and modifications may be made therein without departing from the spirit of the invention or from the scope of the appended claims.

What is claimed is:

1. A sway control device adapted for mounting onto the rear portion of a towing vehicle provided with a pivotal hitch employing a hitch ball having a ball portion, a flange portion connectable to said ball portion and a threaded shank portion, the ball portion being connectable to a coupler provided for the tongue of a trailer comprising in combination:
    a curved guiding means for frictionally engaging the surface of a friction inducing means positioned for limited movement along a curved surface of said guiding means and attached to the trailer comprising two spaced apart curved portions having ends curved toward the tongue of the towed trailer when the coupler is mounted on the hitch ball,
    said curved guiding means securable to said towing vehicle adjacent to said pivotal hitch connection,
    said curved portions being laterally positioned an equal distance one on each side of said pivotal hitch connection with said ends spaced apart from each other not less than 4 inches and not more than 20 inches.

2. The sway control device set forth in claim 1 wherein:
    the perimeter of said curved portion extending between the spaced apart ends having a length of not less than 6 inches.

3. The sway control device set forth in claim 2 wherein:
    the width of said curved guiding surface is not less than 1 inch and not more than 4 inches.

4. The sway control device set forth in claim 2 wherein:
    the width of said curved guiding surface is between 2 and 3 inches.

5. The sway control device set forth in claim 1 wherein:
    the periphery of said curved portions extending between the spaced apart ends having a length of approximately 13 inches.

6. The sway control device set forth in claim 1 wherein:
    said curved guiding means comprises a substantially flat plate having its curved surface mounted laterally thereto for engaging there along the friction inducing means, and said curved surface being provided with guiding means extending toward the towing vehicle to position the friction inducing means comprising a belt in operational alignment with the axis of the ball portion of the hitch ball and to contain said belt in an operational position.

7. The sway control device set forth in claim 6 wherein:
said flat plate is grooved along a part of its periphery, said sway control when mounted on an equalizer head on a towing vehicle causing said plate to engage the top surface of said equalizer head and said groove to expose a part of said equalizer head for functioning of at least a part of its operating parts.

8. The sway control device set forth in claim 7 in further combination with:
an equalizer head having a top surface on which said plate is mounted.

9. The sway control device set forth in claim 6 wherein:
said flat plate is provided with a first aperture.

10. The sway control device set forth in claim 9 wherein:
the flange portion of the hitch ball rests on the top surface of the flat plate when its shank portion extends therethrough.

11. The sway control device set forth in claim 9 wherein:
said flat plate is further provided with a pair of apertures spaced from said first aperture for receiving connecting means for attaching spaced angle bracket thereto.

12. The sway control device set forth in claim 11 in further combination with:
a pair of ninety degree angle brackets one leg of each provided for attachment to the under side of said flat plate and the other leg of each to opposite sides of the tongue of the towed trailer.

13. The sway control device set forth in claim 12 wherein:
said one leg of each bracket is provided with a slot through which a bolt may extend and through one of said pair of apertures for attaching said sway control device to the tongue of the trailer.

14. The sway control device set forth in claim 1 wherein:
said curved portions are separated from each other.

15. The sway control device set forth in claim 1 wherein:
said ends are spaced from each other approximately 9 inches.

16. An arcuate structure utilized in conjunction with a flexible connector operated friction sway control device for a trailer having a tongue and a coupler connectable to a towing vehicle provided with a conventional class 1 or 2 hitch bracket having a conventional hitch ball mounted thereon having an upper ball portion, a middle flanged portion and a threaded shank portion in combination:
a structure used in conjunction with a sway control device comprising a generally flat bottom portion having opposite ends, a middle portion and a perimeter and at least one substantially narrower arcuate portion having a shorter perimeter than said bottom portion extending upwardly therefrom adjacent the perimeter of said bottom portion,
said arcuate portion having curved opposite ends adjacent said opposite ends of said bottom portion terminating at points spaced apart from each other to provide an opening spaced apart from and facing the hitch coupler of a trailer when said coupler is mounted on a hitch ball,
said curved opposite ends being directed inwardly towards said coupler and spaced apart from each other at least 4 inches and not more than 20 inches,
said arcuate portion extending upwardly from said bottom portion a distance of at least one quarter inch and not more than 8 inches,
said arcuate portion comprising at least one continous surface on its outer surface suitable for frictional engagement in cooperation with a flexible connector and tensioning means, and
said arcuate portion comprising opposite substantially identical configurations adjacent its opposite end portions.

17. The structure further defined as in claim 16 wherein:
said outer surface is provided with guiding means to retain and position said flexible connector in general alignment with the horizontal axis of the upper ball portion of a conventional hitch ball when said sway control device is connected for operation.

18. An arcuate structure utilized in conjunction with a flexible connector operated friction sway control device interconnected to a trailer having a tongue and a coupler connected to a towing vehicle provided with an equalizer head secured thereto adapted to receive a conventional hitch ball mounted thereon in combination:
a structure utilized in conjunction with a sway control device comprising a generally flat bottom portion having opposite ends a middle portion and a perimeter and at least one substantially narrower arcuate portion having opposite ends and a perimeter substantially shorter than said bottom portion extending upwardly therefrom adjacent the perimeter of said bottom portion,
said arcuate portion having curved opposite ends adjacent said opposite ends of said bottom portion terminating at points spaced apart from each other to provide an opening spaced apart from and facing the hitch coupler of a trailer when said coupler is mounted on a hitch ball,
said curved opposite ends being directed inwardly toward said coupler and spaced apart from each other at least a distance of 4 inches and not more than 20 inches,
said arcuate portion extending upwardly from said bottom portion substantially perpendicular a distance of at least one quarter of an inch and not more than 10 inches,
said arcuate portion comprising at least one continuous surface on its outer surface suitable for frictional engagement in cooperation with a flexible connector having its open ends adpated for connection to corresponding opposite sides of a trailer vehicle, and
said at least one arcuate portion comprising spaced apart configurations substantially identical adjacent said opposite ends of said bottom portion.

19. An arcuate structure utilized in combination with a flexible connector operated friction sway control device and an equalizer hitch having a head portion adapted for the mounting of a conventional hitch ball and a lower box portion utilized to contain spaced apart spring bars on their one ends and adapted for connection to respective spaced apart sides of a trailer vehicle on their other ends in combination:
an equalizer head adapted to be secured to the rear portion of a towing vehicle,
said equalizer head comprising a top surface utilized for mounting of a conventional hitch ball and a bottom portion utilized for containment of spaced apart spring bars on their one end and extending therefrom having their other end adapted for interconnection to respective opposite sides of a trailer vehicle,
said top surface having opposite end portions, a middle portion and a perimeter surrounding said hitch ball when mounted thereon,
an arcaute portion comprising at least one substantially narrower configuration than said top surface and having a substantially shorter perimeter extending upwardly from said top surface in a substantially perpendicular manner adjacent to said perimeter of said top surface,
said arcuate portion having curved opposite ends adjacent said opposite end portions terminating at points spaced apart from each other substantially equal distant from said hitch ball to provide an opening spaced apart from and facing the hitch coupler of a trailer when said coupler is connected to said hitch ball,
said curved ends being directed inwardly toward said coupler and spaced apart from each other at least 4 inches and not more than 20 inches,
said arcuate portion extending upwardly from said top portion not less than one quarter inch and not more than 10 inches,
said arcuate portion comprising at least one continuous surface suitable for frictional engagement by a flexible connector provided with tensioning means interconnected to opposite sides of a trailer vehicle, and
said arcuate portion comprising substantially identical configurations adjacent the opposite ends of said top surface of said equalizer head.

\* \* \* \* \*